US008315335B2

(12) United States Patent
Dent et al.

(10) Patent No.: US 8,315,335 B2
(45) Date of Patent: Nov. 20, 2012

(54) OFDM SPECTRAL CONTROL

(75) Inventors: Paul Wilkinson Dent, Pittsboro, NC (US); Ali S. Khayrallah, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 657 days.

(21) Appl. No.: 12/541,426

(22) Filed: Aug. 14, 2009

(65) Prior Publication Data

US 2010/0226458 A1 Sep. 9, 2010

Related U.S. Application Data

(60) Provisional application No. 61/157,615, filed on Mar. 5, 2009.

(51) Int. Cl.
*H04K 1/02* (2006.01)
(52) U.S. Cl. ........................................................ 375/296
(58) Field of Classification Search .................. 375/295, 375/296, 302; 370/203, 208, 210; 708/100, 708/200, 300
See application file for complete search history.

(56) References Cited

U.S. PATENT DOCUMENTS

| | | | |
|---|---|---|---|
| 5,959,967 A | 9/1999 | Humphrey et al. | |
| 6,175,550 B1* | 1/2001 | van Nee | 370/206 |
| 6,456,653 B1* | 9/2002 | Sayeed | 375/227 |
| 6,608,529 B2 | 8/2003 | Franca-Neto | |
| 7,023,929 B2 | 4/2006 | Mujica et al. | |
| 7,339,918 B2 | 3/2008 | Piirainen | |
| 7,450,532 B2 | 11/2008 | Chae et al. | |
| 2003/0103578 A1 | 6/2003 | Yeh et al. | |
| 2003/0215007 A1* | 11/2003 | Mottier | 375/229 |
| 2004/0252632 A1 | 12/2004 | Bourdoux et al. | |
| 2005/0118977 A1 | 6/2005 | Drogi et al. | |
| 2006/0019601 A1* | 1/2006 | Kroeger et al. | 455/3.06 |
| 2006/0250935 A1* | 11/2006 | Hamamoto et al. | 370/203 |
| 2008/0159422 A1 | 7/2008 | Chen et al. | |
| 2008/0240265 A1* | 10/2008 | Fechtel | 375/260 |
| 2008/0318613 A1 | 12/2008 | Balachandran et al. | |
| 2009/0054012 A1 | 2/2009 | Lin et al. | |
| 2009/0092193 A1 | 4/2009 | Fujita | |

FOREIGN PATENT DOCUMENTS

| | | |
|---|---|---|
| WO | 2006/007599 A2 | 1/2006 |
| WO | 2007/092945 A2 | 8/2007 |

OTHER PUBLICATIONS

Bourdoux, A. et al. "Non-reciprocal Transceivers in OFDM/SDMA Systems: Impact and Mitigation." Proceeding of the 2003 Radio and Wireless Conference (RAWCON '03), Aug. 10-13, 2003, pp. 183-186.

* cited by examiner

*Primary Examiner* — David C. Payne
*Assistant Examiner* — Vineeta Panwalkar
(74) *Attorney, Agent, or Firm* — Coats & Bennett, P.L.L.C.

(57) ABSTRACT

A method and apparatus for configuring a variable filter in an OFDM transmitter based on the number of subcarrier frequencies selected for the input data block is described herein. An exemplary OFDM transmitter comprises a control unit, OFDM modulator, and variable filter. The control unit selects the number of subcarriers for the input data block, and configures one or more filter properties for the variable filter based on the selected number of subcarriers. The modulator, which has a size greater than the selected number of subcarriers, pads an input data block generated for the selected number of subcarriers to generate an expanded data block having a size equal to the size of the modulator, and modulates the expanded data block to generate an OFDM signal. The filter, as configured by the control unit, filters the OFDM signal.

18 Claims, 6 Drawing Sheets

OFDM SPECTRAL CONTROL

RELATED APPLICATION

This application claims priority to Provisional U.S. Patent Application 61/157,615, filed 5 Mar. 2009, which is incorporated herein by reference.

BACKGROUND

The invention described herein relates generally to OFDM wireless communications, and more particularly to an OFDM transmitter that accommodates variably sized input data blocks.

Orthogonal Frequency Division Multiplexing (OFDM) is a digital multi-carrier modulation technique that uses a plurality of closely-spaced orthogonal subcarrier frequencies to carry data. OFDM operates by dividing a spectrum of transmission data into a multiplicity of narrowband sub-channels with a specific spacing termed "orthogonal spacing," where a fraction of the total data rate specified for the transmission data is modulated onto each sub-channel with a conventional modulation scheme (e.g., quadrature amplitude modulation). With OFDM, different subcarriers are allocated to different users, which allows several users to share the available bandwidth. OFDM is deployed or planned for a variety of wireless systems, including IEEE 802.16 (WiMAX), some IEEE 802.11a/g wireless LANs (Wi-Fi), IEEE 802.20 Mobile Broadband Wireless Access (MBWA), and the like.

A practical implementation of an OFDM transmitter presents data symbol values associated with different subcarrier frequencies of an input data block to different frequency-domain inputs of an Inverse Discrete Fourier Transform (IDFT) processor to generate a time-domain representation of the desired transmission waveform. Subsequently, the digital time-domain representation is converted to an analog stream of modulated symbols. After amplification, the analog symbol stream is wirelessly transmitted to a remote device.

OFDM transmitters are typically designed for a fixed data rate and/or bandwidth. However, wireless communication services provided by OFDM transmitters often involve highly asymmetrical data flow associated with asymmetrical data rates. For example, with mobile internet browsing mouse clicks are transmitted on the uplink while images or other voluminous data are transmitted on the downlink. In another example, a camera-phone may be used to take and email a picture. In this case, voluminous data is transmitted on the uplink while only acknowledgements are transmitted on the downlink. Due to the potential for asymmetrical data flow, a conventional OFDM transmitter may be designed with a fixed data rate and/or bandwidth that accomodates a worst-case scenario, e.g., the scenario having the highest data rate and requiring the widest bandwidth. However, such fixed data rate and/or bandwidth transmitters typically do not efficiently use the available spectrum and power. Ideally, OFDM systems would have the ability to operate at less than the maximum bandwidth by using only a subset of subcarrier frequencies, where the unused spectral slots are fed zero symbol values. However, this approach generally leads to interference with neighboring signals. In particular, while the energy transmitted in unused slots typically drops to the digital noise floor, the non-zero signal energy in the unused slots may still be large enough to interfere with neighboring signals. Thus, there remains a need for an OFDM transmitter that efficiently uses the available spectrum and power while minimizing interference caused by unwanted spectral components in unused spectral slots.

SUMMARY

The present invention provides a method and apparatus for processing input data blocks of varying bandwidths for wireless transmission to a remote device. Generally, the present invention configures one or more properties of a variable filter in an OFDM transmitter based on the number of subcarrier frequencies selected for an input data block. For example, as the number of subcarrier frequencies selected for the input data block increases/decreases, the present invention may increase/decrease the cutoff frequency of the variable filter.

An exemplary OFDM transmitter according to the present invention comprises a control unit, an OFDM modulator, and a variable filter. The control unit selects a number of subcarrier frequencies for an input data block based on a desired data rate, and configures one or more properties of the variable filter based on the selected number of subcarrier frequencies. The input data block for the selected number of subcarrier frequencies is generated and input to the OFDM modulator, where the size of the OFDM modulator exceeds the selected number of subcarrier frequencies. The OFDM modulator pads the input data block to generate an expanded data block having a size matching the size of the OFDM modulator, and modulates the expanded data block to generate a modulated symbol stream, referred to herein as an OFDM signal. The variable filter, as configured by the controller, filters the OFDM signal according to the filter properties selected by the control unit. By configuring the filter based on the number of selected subcarrier frequencies, the present invention provides improved filtration for the OFDM signal.

DETAILED DESCRIPTION

The present invention provides an OFDM transmitter with an analog variable filter having one or more properties configured based on the number of subcarrier frequencies selected for an input data block. For example, the variable filter may be configured to have a wider bandwidth when the input data block has a large number of subcarrier frequencies than when the input data block has a small number of subcarrier frequencies. By configuring the variable filter based on the bandwidth of the input data block, the present invention reduces unwanted spectral components in the unused subcarrier frequencies.

Figure 1:
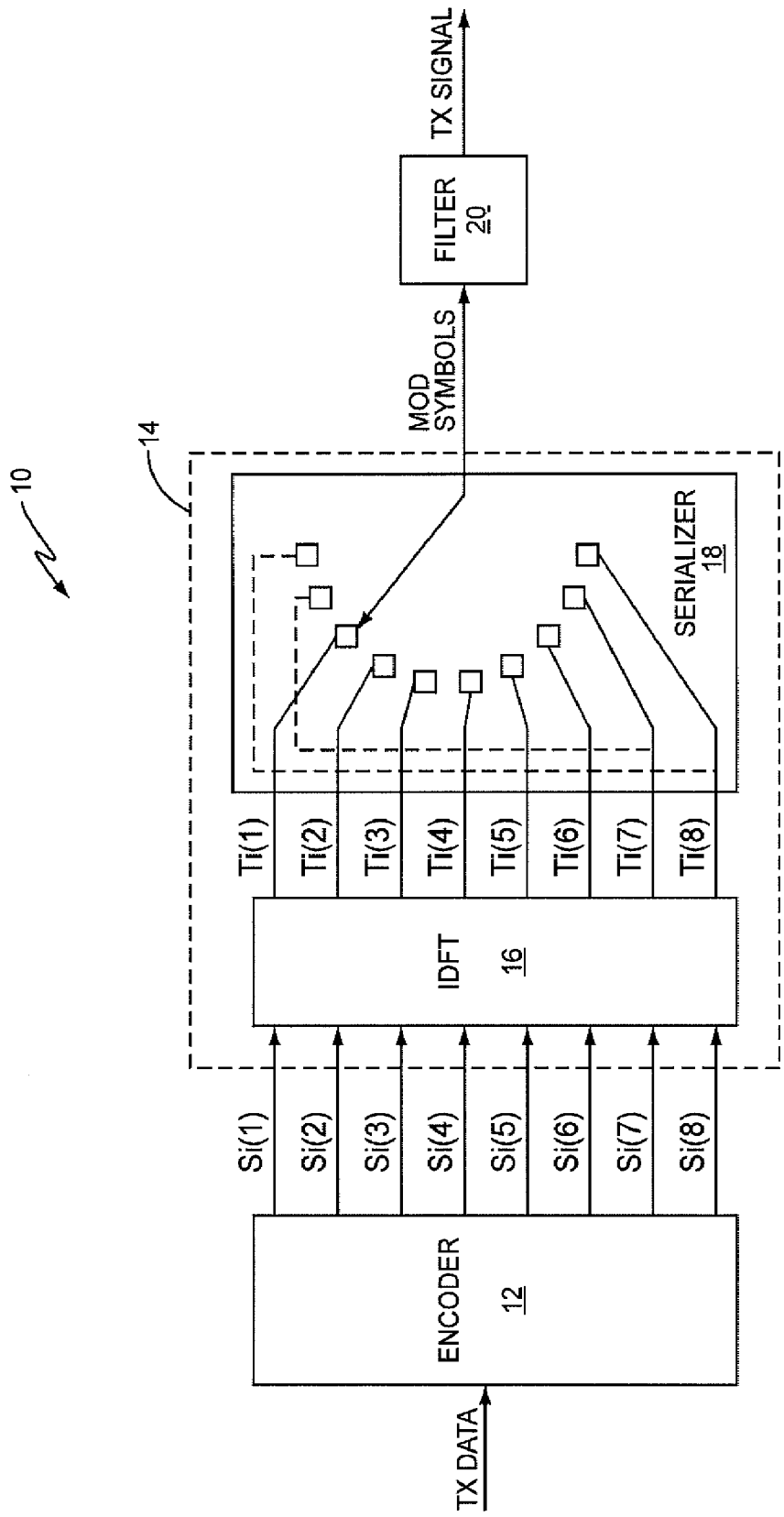
FIG. 1 shows a conventional OFDM transmitter.

To facilitate the detailed description of the present invention, FIG. 1 first shows a conventional OFDM transmitter 10 comprising an encoder 12, OFDM modulator 14, and filter 20. Encoder 12 encodes transmission data to produce an input data block of information-bearing complex signal values in the frequency domain, $S_i(1), S_i(2), \ldots, S_i(N)$, which, for example, may comprise 16-QAM symbol values. Modulator 14 modulates the values in the input data block to generate an analog modulated symbol stream. Filter 20 filters the modulated symbols to produce a transmission signal comprising complex (I, Q) symbols.

Modulator 14 comprises an inverse discrete Fourier transform (IDFT) unit 16 and a serializing unit 18. IDFT unit 16 transforms the digital frequency-domain values of the input data block to generate a time waveform comprising a block of time-domain samples $T_i(1), T_i(2), \ldots, T_i(N)$. Serializing unit 18 sequentially selects the IDFT output samples to convert the IDFT output samples to produce the analog stream of modulated symbols. While not required, serializing unit 18 may repeat some of the first samples at the end to include a cyclic prefix/postfix in the modulated symbol stream, as shown in FIG. 1. Such cyclic prefixes/postfixes ensure that a whole block of samples are received even if there is a small timing error not greater than the length of the cyclic prefix. As such, a cyclic prefix and/or postfix renders OFDM transmissions relatively insensitive to time delay spread. The cyclic prefix samples may be tapered smoothly to zero away from the main sample block in some implementations known as pulse-shaped OFDM, which are more fully described in U.S. patent application Ser. Nos. 12/126,576 and 12/045,157 to Applicant Dent.

Ideally, the transmission signal output by filter 20 exhibits spectral energy only in OFDM subcarriers corresponding to non-zero input values. However, depending on the tapering function used to shape the cyclic prefix and the cutoff sharpness of filter 20, there will be spectral tails outside this range. For any given transmission protocol, the cyclic prefix is pre-specified and the number of non-zero subcarriers in use is also pre-determined. Thus, one way to reduce the spectral tails is to use a sharper cut-off filter. Alternatively, IDFT unit 16 may be over dimensioned such that the time waveform $T_i(1), T_i(2), \ldots, T_i(N)$ is effectively oversampled, e.g., the sample rate is greater than the Nyquist rate for the desired bandwidth of the input data block. Oversampling the time waveform causes quantizing noise due to finite digital word lengths and arithmetic accuracy to be spread over a larger bandwidth, and therefore, reduces its spectral density. Thus, an over dimensioned IDFT unit 16 distances unwanted spectral aliases from the wanted spectrum.

When the system uses all of the available bandwidth, over dimensioning the IDFT unit 16 may ease some filter requirements, as described by U.S. patent application Ser. Nos. 12/126,576 and 12/045,157 to Applicant Dent, which are incorporated herein by reference. However, when the system uses fewer active subcarrier frequencies, e.g., when operating at a bandwidth less than the full bandwidth, the unused subcarrier frequencies may contain energy at an undesirably high level that interferes with other services using the same spectrum. Such unwanted energy arises from digital quantizing noise and thermal noise in oscillators, modulators, and amplifiers. To address this problem, the present invention provides a method and apparatus for configuring one or more filters in the transmitter before and/or after the digital-to-analog converter based on a selected number of subcarrier frequencies. Filters ahead of the digital-to-analog converter may be digitally implemented and configured based on the selected number of subcarrier frequencies at low cost. In some cases, however, the finite word length of the digital-to-analog converter may prevent such digital filters from reducing the quantizing noise of the digital-to-analog converter. U.S. Pat. No. 6,278,867 to Dent, which is incorporated herein by reference, provides one method for addressing this problem. The '867 patent discloses that when the word length or precision of a computed digital signal value to be converted is greater than the word length or precision of the digital-to-analog converter, the digital signal value can be added to a holding register at each sample instant, and a number of most significant bits equal to the word length are extracted to the digital-to-analog converter for conversion, leaving a remainder equal to the un-extracted least significant bits. The cumulative remainder adds to the subsequent values to be converted, causing a carry from time to time to the extracted bits, and therefore, outputting all value amounts over time. This has the effect of pushing the quantizing noise spectrum into a higher frequency range, where it is more easily removed by analog filtering following digital-to-analog conversion. The present invention, therefore, may also configure one or more analog filters in the transmitter to increase the attenuation of unwanted noise components.

The present invention thus provides an OFDM transmitter 100 that enables the number of subcarrier frequencies for an input data block to be selected based on a desired data rate by configuring a variable filter 140 based on the selected number of subcarrier frequencies. For example, the filter bandwidth, cut-off frequency, filter slope, etc., may be configured based on the selected number of subcarrier frequencies. Alternatively, the variable filter 140 may be configured by selecting an anti-aliasing filter having the desired configuration from a number of pre-determined anti-aliasing filters available to the transmitter 100.

Figure 2:
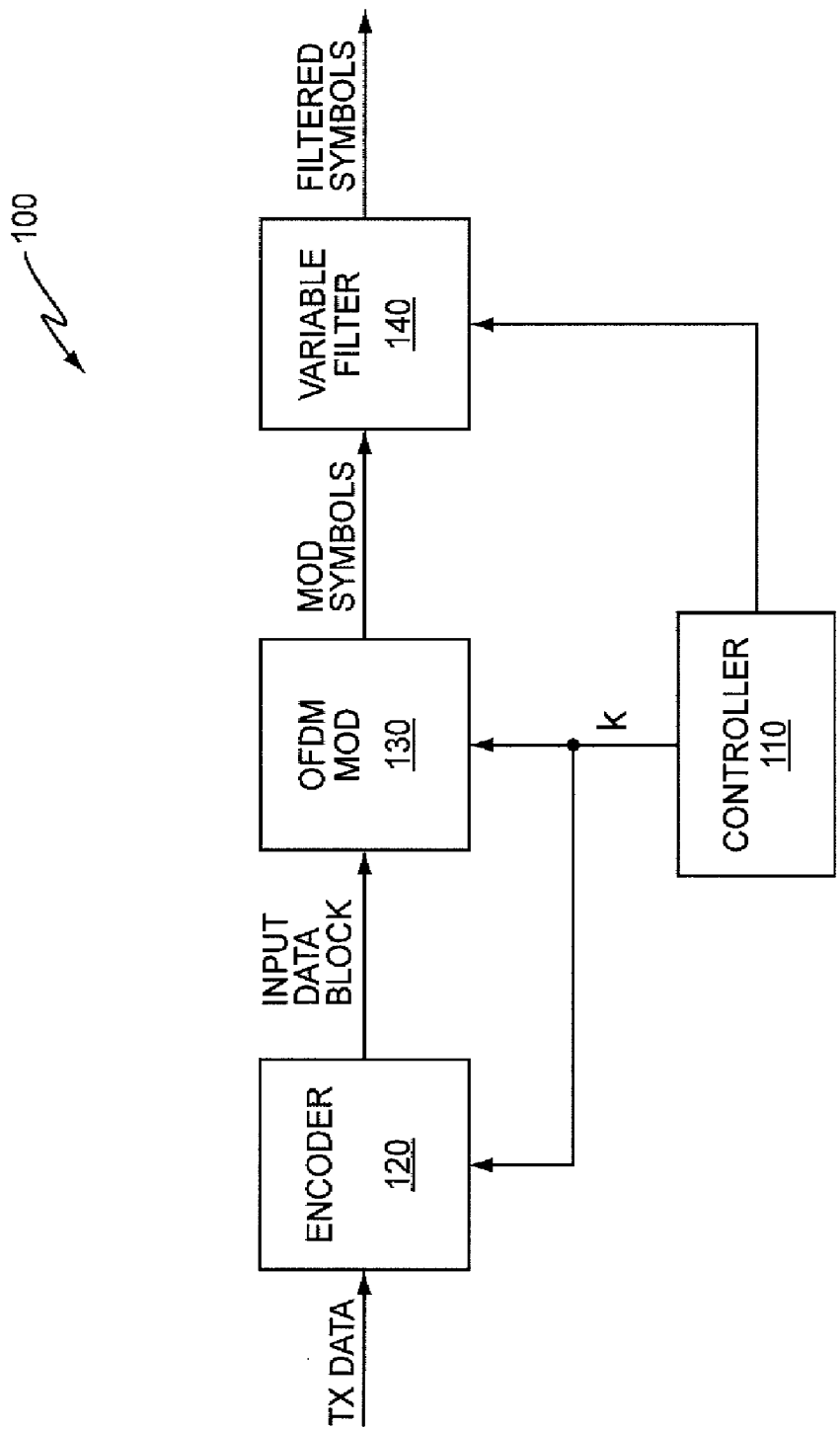
FIG. 2 shows an exemplary OFDM transmitter according to one embodiment of the present invention.

FIG. 2 shows an exemplary OFDM transmitter 100 according to one embodiment of the present invention. Transmitter 100 comprises controller 110, encoder 120, OFDM modulator 130, and variable filter 140. Controller 110 selects the number k of subcarrier frequencies for an input data block based on a desired data rate and provides this number k to encoder 120 and OFDM modulator 130. For example, an OFDM symbol is defined as the waveform block produced by the OFDM modulator 130 corresponding to a given set of input values in the input data block. One OFDM waveform block is transmitted in a fixed period called an OFDM symbol period. In the OFDM symbol period, therefore, a number of data symbols are transmitted corresponding to the number of input values that were presented in the input data block at the input of the OFDM modulator 130. Thus, the transmitted data rate is equal to N data symbols per OFDM symbol period, and the data rate may thus be increased by increasing N, e.g., by using more of the OFDM input subcarrier slots for data symbols. Controller 110 may thus allocate a large number of subcarrier frequencies to users having a high data rate, or a small number of subcarrier frequencies to users having a low data rate. In addition, controller 110 configures one or more properties for variable filter 140 based on the selected number k of subcarrier frequencies. For example, the controller may configure the cutoff frequency for the filter 140 based on the selected number of subcarrier frequencies. In one exemplary embodiment of the present invention, filter 140 is configured to have a bandwidth that is either continuously or stepwise variable.

Encoder 120 encodes transmission data using any known encoding technique to generate the input data block for the selected number k of subcarrier frequencies. The size of OFDM modulator 130 exceeds the number of subcarrier frequencies selected for the input data block. As used herein, the size of the OFDM modulator 130 generally corresponds to the size of a frequency transform unit in the OFDM modulator 130, e.g., the over-dimensioned transform unit 134 shown in FIG. 3. OFDM modulator 130 pads the borders of the input data block with null values to expand the input data block to match the size of the transform unit 134, and therefore, to match the size of the modulator 130. The waveform output by the transform unit 134 comprises a sequence of complex numbers having a real part I and an imaginary part Q. The sequence of real parts (I-values) may be digitally filtered with a digital filter prior to digital-to-analog conversion as indicated above. Likewise, the sequence of imaginary parts (Q-values) may be filtered with an identical filter. Subsequently, the filtered I, Q samples are converted to a continuous time OFDM signal. For example, a pair of identical digital-to-analog converters operating in parallel may be used. Other known methods may also be used, e.g., feeding the sequence I1, Q1, −I1, −Q1, I2, Q2, −I2, −Q2, . . . successively into a single digital-to-analog converter, which results in an output signal shifted in frequency to lie around ¼ the sample rate. In the former method, the outputs of the pair of digital-to-analog converters are smoothed using anti-aliasing or smoothing filters, which comprise low-pass filters. In the latter method, the output of the single digital-to-analog converter may be smoothed using a bandpass filter centered on the frequency corresponding to ¼ the sample rate. Regardless of the type of digital-to-analog conversion used, analog smoothing filters are used to limit the unwanted spectral components. The present invention implements the analog smoothing filters using a variable filter 140, where the controller 110 configures the filter 140 based on the number of data symbols per OFDM symbol period input to the transform unit 134. Controller 110 may configure filter 140 by adapting the filter bandwidth, cut-off frequency, filter slope, etc. Alternatively, controller 110 may configure filter 140 by selecting a filter with the desired properties from a number of predetermined filters available to the transmitter 100.

Figure 3:
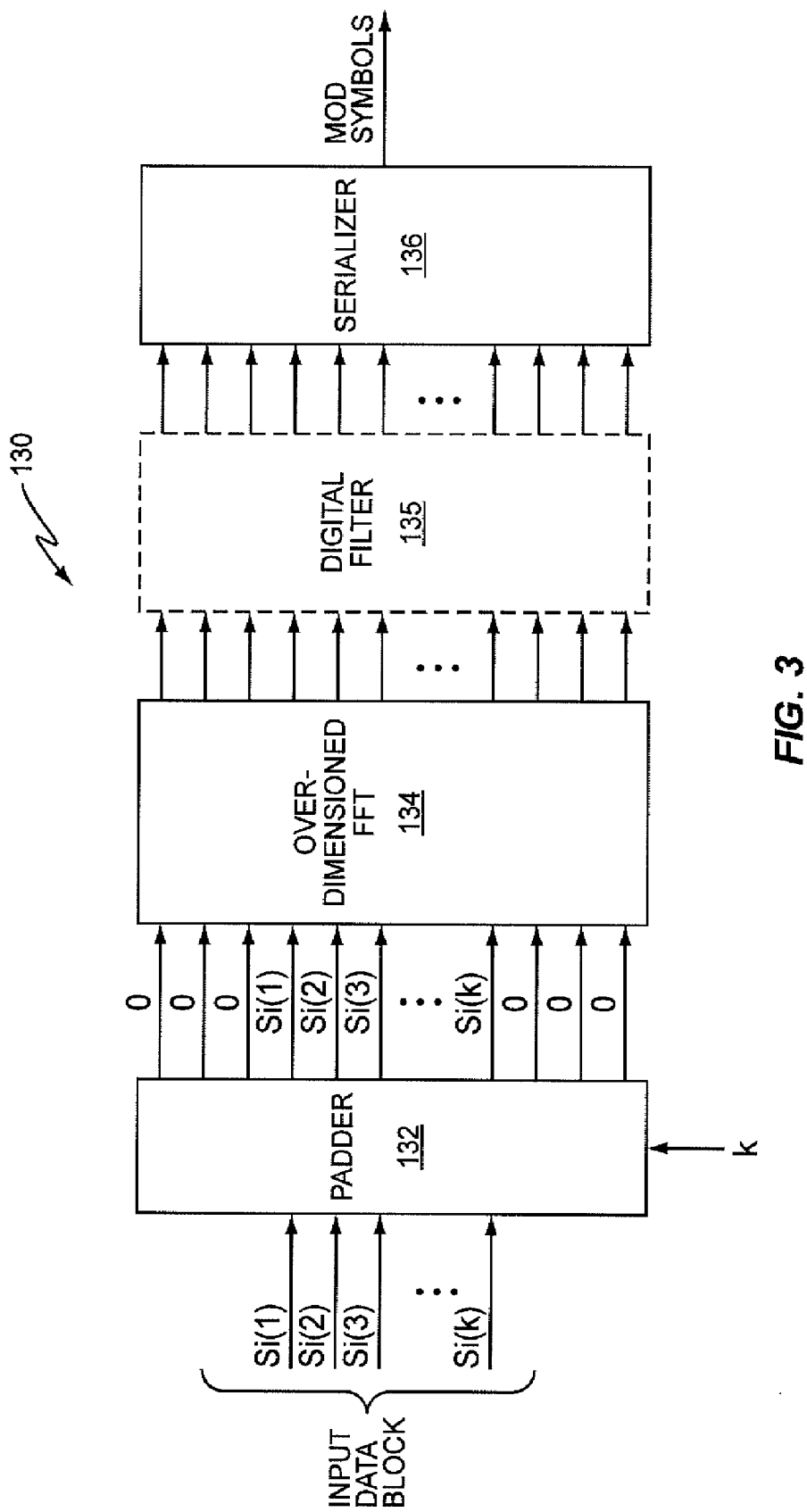
FIG. 3 shows a exemplary OFDM modulator according to one embodiment of the present invention.

It will be appreciated that properties of any digital filters after the transform unit 134 and before any digital-to-analog conversion, such as the optional digital filters 135 shown in FIG. 3, may alternatively or additionally be configured based on the number of data symbols per OFDM symbol period input to the transform unit 134. In this embodiment, the digital filter 135 may operate on the frequency transformed output while such data is still in memory. In this case, the digital filter 135 may use some of the frequency transformed data output by the over-dimensioned transform unit 134 during a previous time interval and stored in memory. While FIG. 3 shows digital filters 135 disposed after the transform unit 134 and before the serializer 136, those skilled in the art will appreciate that the digital filters 135 may alternatively be disposed after the serializer 136 and before any digital-to-analog converter (not shown). In this case, frequency transformed data from previous time intervals is automatically presented to the digital filter 135 because the serializer 136 presents the current symbol stream immediately after the previous symbol stream.

The filtered analog OFDM signal is up-converted to the desired radio frequency channel. In the case of I, Q signals, a quadrature modulator may be used to implement the up-conversion. For example, a quadrature modulator may be configured as a single-sideband up-converter according to any known means. After up-conversion, a power amplifier (not shown) amplifies the signal for transmission via a transmitting antenna (not shown). The power amplifier may be connected to the transmitting antenna via a duplexing filter (not shown) that prevents the transmission from inhibiting simultaneous reception by an associated receiver in a separate receive frequency band. In wideband OFDM systems, the duplexing filter may introduce relative phase and amplitude changes between different subcarrier frequencies of the OFDM transmission, which can cause problems at the receiver. The present invention may also compensate for these effects while simultaneously compensating for any changes introduced by the variable anti-aliasing filters. For simplicity, the following assumes that the pair of digital-to-analog converters is used. However, a person skilled in the art will appreciate that the present invention applies to any known modulation and/or up-conversion methods.

FIG. 3 shows a block diagram for an exemplary OFDM modulator 130 according to one embodiment of the present invention. OFDM modulator 130 comprises a padding unit 132, an over dimensioned transform unit 134, e.g., an over dimensioned Fourier transform unit, and a serializing unit 136. Padding unit 132 adds null values to either end of the input data block, where the null values represent subcarrier frequency values in which no energy should fall, e.g., spectrum not allocated to the current transmission. To accommodate different sized input data blocks, padding unit 132 changes the number of bordering null values added to the input data block to maintain the same number of inputs into the over dimensioned transform unit 134. The number of bordering null values added by padding unit 132 is determined based on the number k of selected subcarrier frequencies, which is provided by controller 110. For example, when the number of wanted subcarriers is reduced, the number of bordering null values is increased to maintain the same array size input to the transform unit 134.

The input to the over dimensioned transform unit 134 comprises the expanded data block. Over dimensioned transform unit 134 transforms the expanded data block by converting the frequency domain inputs of the expanded data block to time domain samples according to any known means. Serializing unit 136 converts the digital time-domain samples output by transform unit 134 to an analog modulated OFDM signal, as discussed above.

Figure 4A:
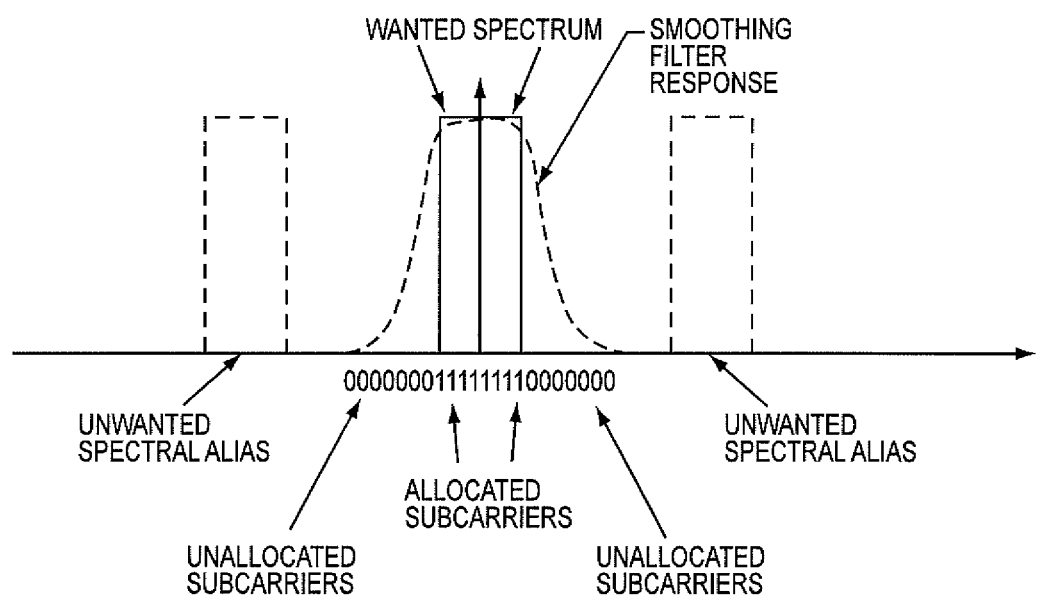
FIGS. 4A and 4B show exemplary spectra and filter responses for different numbers of allocated subcarrier frequencies.
Figure 4B:
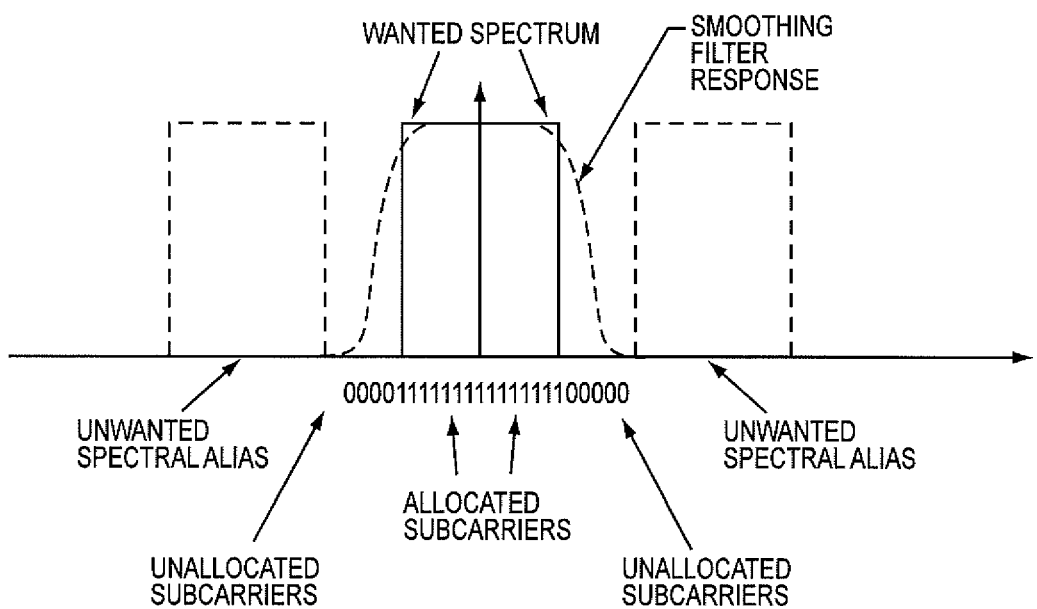

FIGS. 4A and 4B illustrate exemplary spectra and filter responses when the number of allocated subcarrier frequencies is varied based on the desired data rate for the selected wireless service. In these examples, it is assumed that over dimensioned transform unit 134 is of constant size that exceeds the size of an expected input data block. For example, the size of the over dimensioned transform unit 134 may be conveniently chosen to be a power of two, allowing for a simpler base-2 realization, which provides greater computational efficiency. It is likely that a transform unit 134 with a fixed size will be used if an optimum, hardwired design is used. However, the present invention is not limited to such fixed-sized transform units.

FIG. 4A shows an exemplary spectrum resulting when the number of allocated subcarriers is smaller, and the number of null values is greater. The wanted spectrum is thus narrower and there is a greater distance to the unwanted spectral aliases. If it is desired to allocate another user to the intervening spectrum, filter 140 should cut-off as soon as possible to limit the transmitter noise floor in the other user's spectrum.

FIG. 4B shows an exemplary spectrum resulting when the selected number of subcarriers is greater, and the number of bordering null values is smaller. The wanted spectrum in this case is wider and there is a smaller gap to the spectral aliases. Thus, filter 140 should not begin to cutoff as early as in FIG. 4A, but should still have sufficient attenuation at the alias frequencies. As a result, the requirements for filter 140 are not the same for FIG. 4A as for FIG. 4B. If the filter 140 used for the example of FIG. 4B is used for the example of FIG. 4A, the alias attenuation will likely be adequate, but there will be little to no attenuation of the noise floor in parts of the spectrum that may be allocated to another user. Thus, performance will improve if the filter 140 used for the example of FIG. 4A has a narrower bandwidth than the filter used for the example of FIG. 4B.

Figure 5A:
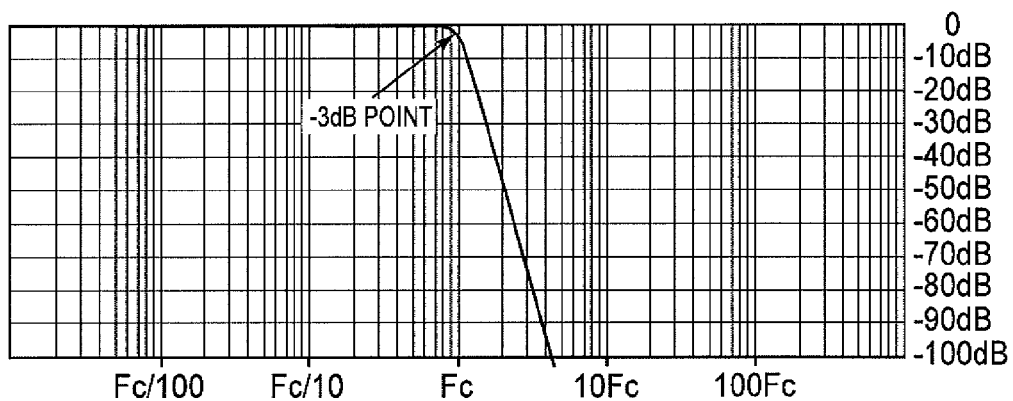
FIGS. 5A and 5B show an exemplary analog filter response.

FIG. 5A shows one exemplary frequency response for an $8^{th}$ order Butterworth (maximally flat) filter that provides approximately 48 dB of attenuation one octave away from the −3 dB cut-off frequency. In FIG. 4B, which corresponds to about 50% oversampling, there is one octave between the highest wanted frequency and the lowest unwanted frequency of the first alias. Thus, a filter of at least the complexity of the $8^{th}$ order filter shown in FIG. 5A could be used to adequately suppress the aliases for the example shown in FIG. 4B.

Figure 5B:
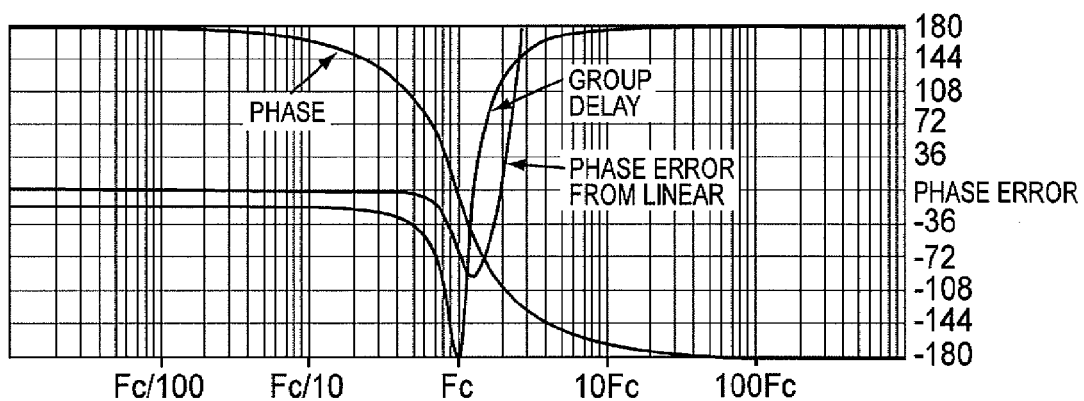
Figure 6:
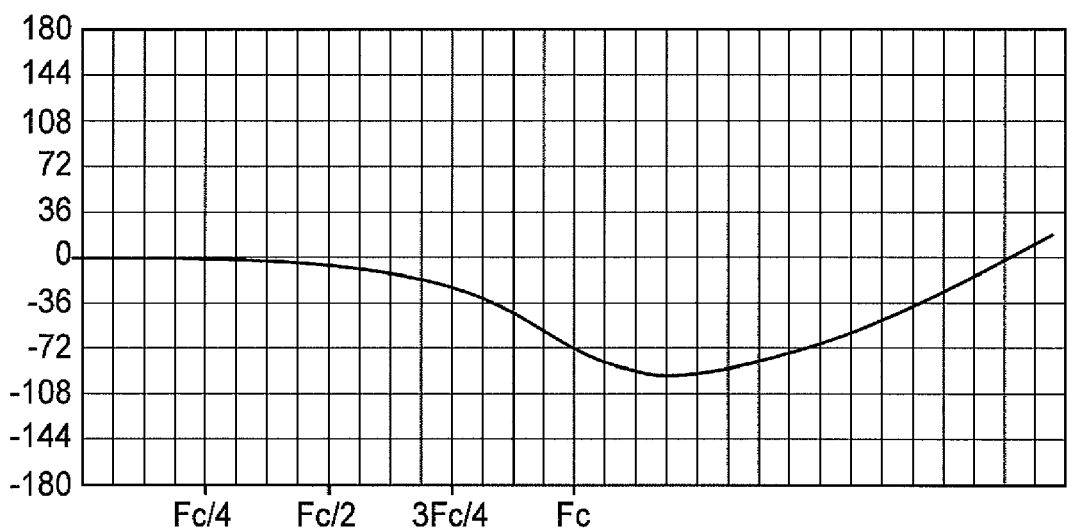
FIG. 6 shows the phase error vs. linear frequency.

The present invention may also pre-compensate for amplitude and phase errors caused by the filter 140 and/or any duplexing filters so that the frequency response of the transmission signal output by the filter 140 is generally flat. For example, FIG. 5B plots the phase, group delay, and phase error relative to linear phase for the filter of FIG. 5A. The phase error, e.g., the phase departure from linear phase, is the most relevant, and shows that, at the −3 dB cut-off frequency, the magnitude of the phase error is nearly 70°. FIG. 6 plots this phase error on a linear scale of frequency to give a better appreciation of the number of OFDM subcarriers affected by this phase error. It may be seen that the phase error starts to become significant in the 5° region already at $F_c/2$, which is one octave below the −3 dB cut-off frequency. The phase error rises to approximately 20° at $3F_c/4$, and rises further to approximately 70° at $F_c$. As a result, approximately half of the OFDM subcarriers, and in particular about half the pilot symbols, are transmitted with phases other than those expected. This may cause problems, e.g., non-reciprocity of the uplink and downlink directions.

One solution to the non-reciprocity problem is to over dimension the transform unit 134 even further. Because FIG. 4B already relies on a 1.5:1 over dimensioned transform unit, a further factor of two is required to further over dimension the transform unit, thus indicating 3:1 over dimensioning. However, transform units already represent a challenging area for OFDM systems. Thus, the further increases in power consumption and chip area required by 3:1 over dimensioning are not desirable.

An alternate solution to the non-reciprocity problem provided by present invention pre-compensates one or more values in the input data block to correct the amplitude and/or phase error associated with the frequency response of filter 140. To that end, potential analog filters are characterized during design or using an in-circuit calibration procedure to determine their complex frequency response at each potential OFDM subcarrier frequency. The reciprocal of the determined values are then computed and stored in an array of complex calibration values in memory. When it is desired to modulate a set of information bearing values on a corresponding number of OFDM subcarrier frequencies, the values in the input data block are pre-compensated, e.g., by complex multiplication, with a corresponding calibration value retrieved from memory that compensates for the analog filter's amplitude and/or phase errors. The resulting transmission signal output by filter 140 generally has a flat frequency response, and therefore, has values on each OFDM subcarrier that are generally equal to the desired information bearing values. In this way, a designer has the freedom to independently choose the analog filter implementation while still meeting a specification for the accuracy of the transmitted values.

For the $8^{th}$ order Butterworth filter of FIGS. 5 and 6, for example, the −3 dB cutoff frequency is set at the band-edge OFDM subcarrier frequencies, where the information-bearing value $S_i(n)$ to be modulated on to the subcarrier lying at $+F_c$ would be phase advanced by approximately 70° and increased in amplitude by 3 dB prior to application to the input of the over dimensioned transform unit 134. Likewise the value at $3F_c/4$ would be phase advanced by approximately 20° while insignificant amplitude correction is needed at that frequency. By thus pre-compensating the values at the input of the transform unit 134 for the analog filter response, the frequency response of the desired transmission signal is generally flat, or at least can be made to conform to specified requirements for transmitted phases and amplitudes, while still allowing freedom in the design of the variable filter 140.

The present invention provides an OFDM transmitter that selects the number of subcarrier frequencies for an input data block based on a desired data rate, and configures a variable filter based on the selected number of subcarriers. In so doing, the OFDM transmitter of the present invention provides improved filtering of the transmitter noise floor when using less than the maximum bandwidth. The OFDM transmitter may further pre-compensate values in the input data block for phase and/or amplitude distortion caused by the variable filter to ensure that the transmission signal output by the filter generally has a flat frequency response, thereby providing improved filtering of the transmitter noise floor while still meeting an accuracy specification for the phase and amplitude of the transmissions on each used subcarrier frequency.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of processing data for transmission to a remote device via a wireless network, the method comprising:
    generating an input data block for a selected number of subcarrier frequencies for input to an OFDM modulator, wherein a size of the OFDM modulator exceeds the selected number of subcarrier frequencies;
    padding the input data block to generate an expanded data block having a size matched to the size of the OFDM modulator;
    modulating the expanded data block to generate a modulated symbol stream;
    filtering the modulated symbol stream with a variable filter;
    configuring one or more filter properties for the variable filter based on the selected number of subcarrier frequencies; and
    pre-compensating at least one of an amplitude and phase of one or more values in the input data block to correct at least one of an amplitude error and a phase error introduced by the filtering step.

2. The method of claim 1 wherein generating the input data block comprises encoding transmission data to generate the input data block for the selected number of subcarrier frequencies.

3. The method of claim 1 further comprising selecting the number of subcarrier frequencies based on a desired transmission data rate.

4. The method of claim 1 wherein padding the input data block comprises padding the input data block with null values to generate the expanded data block.

5. The method of claim 1 wherein configuring one or more filter properties comprises configuring at least one of a filter bandwidth, cut-off frequency, and filter slope for the variable filter.

6. The method of claim 1 wherein configuring one or more filter properties for the variable filter comprises selecting a filter from a predetermined number of fixed filters based on the selected number of subcarrier frequencies.

7. The method of claim 1 wherein modulating the expanded data block comprises:
performing a frequency transform on the expanded data block using the over dimensioned transform unit having a size matched to the expanded data block; and
serializing the frequency transformed data block to generate the modulated symbol stream.

8. The method of claim 7 further comprising configuring a digital filter to filter the frequency transformed data block based on the selected number of subcarrier frequencies.

9. The method of claim 1 wherein filtering the modulated symbol stream comprises filtering the modulated symbol stream with one of a continuously variable filter and a step-wise variable filter.

10. An OFDM transmitter configured to process data for transmission to a remote device via a wireless network, the transmitter comprising:
a control unit configured to:
select a number of subcarrier frequencies in an input data block; and
select one or more filter properties based on the selected number of subcarrier frequencies;
an OFDM modulator having a size greater than the selected number of subcarrier frequencies, the OFDM modulator comprising:
a padding unit to pad the input data block to generate an expanded data block; and
a modulation unit having a size matching the size of the expanded data block and configured to modulate the expanded data block to generate a modulated symbol stream; and
a variable filter configured to filter the modulated symbol stream according to the selected filter properties,
wherein the OFDM modulator further pre-compensates at least one of an amplitude and phase of one or more values in the input data block to correct at least one of an amplitude error and phase error introduced by the variable filter.

11. The OFDM transmitter of claim 10 further comprising an encoder to encode transmission data to generate the input data block for the selected number of subcarrier frequencies.

12. The OFDM transmitter of claim 10 wherein the control unit selects the number of subcarrier frequencies based on a desired transmission data rate.

13. The OFDM transmitter of claim 10 wherein the padding unit is configured to pad the input data block with null values to generate the expanded data block.

14. The OFDM transmitter of claim 10 wherein the one or more filter properties comprise at least one of a filter bandwidth, cut-off frequency, and filter slope.

15. The OFDM transmitter of claim 10 wherein the modulation unit comprises:
an over dimensioned transform unit to perform a frequency transform on the expanded data block, said over dimensioned transform unit having a size matched to the expanded data block; and
a serializer to serialize the frequency transformed data block to generate the modulated symbol stream.

16. The OFDM transmitter of claim 15 further comprising a digital filter configured to filter the frequency transformed data block according to the selected filter properties.

17. The OFDM transmitter of claim 15 wherein the over dimensioned transform unit uses a 1.5:1 over-dimensioning.

18. The OFDM transmitter of claim 10 wherein the variable filter comprises one of a continuously variable filter and a step-wise variable filter.

* * * * *